United States Patent [19]
Shibata et al.

[11] Patent Number: 5,893,041
[45] Date of Patent: Apr. 6, 1999

[54] SUSPENSION APPARATUS FOR CHANGING CHARACTERISTICS OF A VEHICLE SUSPENSION BY CONTROLLING HYDRAULIC CYLINDERS

[75] Inventors: Mineharu Shibata, Ohtake; Shin Takehara, Higashihiroshima, both of Japan

[73] Assignees: Naldec Corp.; Mazda Motor Corp., both of Hiroshima-ken, Japan

[21] Appl. No.: 789,203

[22] Filed: Jan. 24, 1997

Related U.S. Application Data

[63] Continuation of Ser. No. 488,860, Jun. 9, 1995, abandoned, which is a continuation of Ser. No. 90,256, Jul. 13, 1993, abandoned.

[30] Foreign Application Priority Data

Jul. 14, 1992 [JP] Japan .................................. 4-186607

[51] Int. Cl.⁶ .................................................. B60G 17/00
[52] U.S. Cl. ............................. 701/38; 280/707; 280/840
[58] Field of Search ........................ 364/424.01, 424.05, 364/426.01; 280/707, 840

[56] References Cited

U.S. PATENT DOCUMENTS

| | | | |
|---|---|---|---|
| 5,047,938 | 9/1991 | Yokote et al. | 364/424.05 |
| 5,056,813 | 10/1991 | Shibata et al. | 280/840 |
| 5,066,041 | 11/1991 | Kindermann et al. | 364/424.05 |
| 5,083,811 | 1/1992 | Sato et al. | 280/707 |
| 5,088,759 | 2/1992 | Takehara et al. | 280/707 |
| 5,088,761 | 2/1992 | Takehara et al. | 280/707 |
| 5,103,397 | 4/1992 | Ikemoto et al. | 364/424.05 |
| 5,104,143 | 4/1992 | Yonekawa | 364/424.05 |
| 5,119,297 | 6/1992 | Buma et al. | 364/424.05 |
| 5,130,926 | 7/1992 | Watanabe et al. | 364/424.05 |
| 5,142,476 | 8/1992 | Shibata et al. | 364/424.05 |
| 5,144,558 | 9/1992 | Fukushima et al. | 364/424.05 |
| 5,162,995 | 11/1992 | Ikemoto et al. | 364/424.05 |
| 5,253,174 | 10/1993 | Inagaki et al. | 364/424.05 |
| 5,294,146 | 3/1994 | Tabata et al. | 364/424.05 |

FOREIGN PATENT DOCUMENTS

| 3830129 Kokai | 3/1989 | Germany . |
|---|---|---|
| 3-182826 | 12/1989 | Japan . |

OTHER PUBLICATIONS

Office Action issued on Oct. 21, 1994 from German Patent Office (translation of Office Action only).

*Primary Examiner*—Kevin J. Teska
*Assistant Examiner*—Russell W. Frejd

[57] ABSTRACT

A suspension apparatus for vehicles capable of changing the characteristic of the suspension by controlling supply/release of fluid into/from hydraulic cylinders which are respectively provided between a vehicle body and-at least two wheels provided on the right and left side of the vehicle body. The suspension apparatus includes a pressure detection sensor for detecting a pressure in the hydraulic cylinders and an acceleration detection sensor for detecting a lateral acceleration signal of the vehicle body. A target pressure difference is set to control supply/release of the fluid into/from the right and left cylinders based on the detected pressure differences of the right and left cylinders. The target pressure difference is corrected based on the detected lateral acceleration, and a flow amount supplied into and drawn from control-objective cylinders of the hydraulic cylinders is controlled using signals detected so that a pressure difference within the right and left cylinders goes toward the corrected target pressure difference.

20 Claims, 11 Drawing Sheets

SUSPENSION APPARATUS FOR CHANGING CHARACTERISTICS OF A VEHICLE SUSPENSION BY CONTROLLING HYDRAULIC CYLINDERS

This application is a continuation of application Ser. No. 08/488,860, filed Jun. 9. 1995, now abandoned, which is a continuation of application Ser. No. 08/090,256, filed Jul. 13, 1993, abandoned.

BACKGROUND OF THE INVENTION

1. Field of the Invention

The present invention relates to a suspension apparatus for vehicles capable of changing the characteristics of suspension by controlling supply and release amounts of hydraulic flow to hydraulic cylinders.

2. Description of the Related Art

A conventional suspension apparatus, an active control suspension apparatus (ACS apparatus) is well known as disclosed in Japanese Kokai No. Hei 3-182826. This ACS apparatus is provided with a hydraulic cylinder between a vehicle body and each wheel, and changes the characteristic of the suspension in accordance with a driving state by independently controlling the fluid flow amount to each hydraulic cylinder by a flow control valve.

In the conventional technique, as shown in FIG. 10, a vehicle height signal and vertical acceleration signal are collected on each wheel, and a bouncing component, pitching component, and rolling component of vehicle movement are extracted from those signals. Flow control signals ($Q_1$, $Q_2$, $Q_3$) are calculated for hydraulic cylinders to suppress a movement of the vehicle body on each of bouncing mode, pitching mode, and rolling mode. The signal $Q_1$ is a vehicle-height control signal, signal $Q_2$ is a height displacement suppression signal, and signal $Q_3$ is a vertical displacement suppression signal. In the conventional suspension apparatus, a pressure signal of the cylinder and a lateral acceleration signal as well as the above vehicle-height signal and vertical acceleration signal are inputted as parameters for active control of the suspension, and flow control signals $Q_4$ and $Q_5$ are outputted for correction of the rolling suppression control (warp/twist suppression control). Note that an acceleration is referred to as "G" hereinafter.

In the above-described conventional technique, a lateral G signal is used other than a height signal and vertical G signal in order to determine if a transitional rolling movement of the vehicle body is caused by vibration from the wheels or from the vehicle body along with turn. The rolling of the body may be caused when a part of the body is vertically vibrated or when the vehicle is turning. However, the lateral G signal is caused only when the vehicle is turning. Accordingly, when the lateral G signal has occurred, which means that the vehicle is in a turn, the suspension control for rolling suppression based on the vertical G signal is performed with consideration of the lateral G signal. On the other hand, when the lateral G signal does not occur, the suspension control based on the vertical G signal is applied stronger. Thus, the rolling suppression control can be accurately executed regardless of whether a turning operation is in process or not.

As shown in FIG. 10, the feature of the conventional technique is in that the control to generate a signal $Q_4$ based on pressures in the four hydraulic cylinders is independently performed with the control to input a lateral G signal and generate a signal $Q_5$. Accordingly, when a pressure difference occurs between a left cylinder and a right cylinder, the signal $Q_4$ is generated in accordance with the difference, while when a lateral acceleration G signal occurs, the signal $Q_5$ is generated in accordance with the acceleration.

Consider the case where the vehicle approaches and turns a corner as shown in FIG. 11. When the vehicle is located at the position A, the movement of the vehicle is a straight drive, therefore, neither signal $Q_4$ nor $Q_5$ is generated. When the vehicle is at the position B, the vehicle body is rolled since it has approached the corner, and the signals $Q_4$ and $Q_5$ are both generated. Furthermore, when the vehicle is at the position C, it is in a constant turning state. In this state, since the amount of the lateral G is constant, the signals $Q_4$ and $Q_5$ should be constant. However, when a pressure difference is generated between the right cylinder and left cylinder, the pressure difference generates the signal $Q_4$, resulting in a change of the vehicle movement. Furthermore, it generates the lateral G, and the signal $Q_5$ is changed, resulting in the change of the vehicle movement. It further causes a pressure difference. Accordingly, in the case where the vehicle turns, even when the turn has started and the vehicle is in a constant turning state, a rolling direction inversion of the vehicle body is repeated and the movement is unstable. That is, as shown in FIG. 12, the rolling control at the position C is delayed.

As shown in FIG. 10, since the control based on the cylinder pressure and control based on the lateral G signal are independently performed, if one of these tries to perform the most suitable control at some point, that control may not be preferable to the other (that is, a continuity of the rolling is insufficient). The problem arises not only when the vehicle is in turn, but also when a rolling state is generated in the ACS apparatus.

SUMMARY OF THE INVENTION

Accordingly, in light of the above problems, it is an object of the present invention to provide a suspension apparatus for a vehicle capable of improving a rolling continuity and smoothly stabilizing the steering characteristics and vehicle movement.

According to the present invention, as shown in FIG. 1, the foregoing object is attained by a suspension apparatus for a vehicle capable of changing the characteristic of the suspension by controlling supply/release of fluid into/from hydraulic cylinders which are respectively provided between a vehicle body and each wheel, comprising: pressure detection means for detecting cylinder pressures ($P_{FR}$, $P_{FL}$, $P_{RR}$, $P_{RL}$); acceleration detection means for detecting a lateral acceleration signal $Y_G$ of the vehicle body; and control means for controlling supply/release amounts of the fluid with respect to the hydraulic cylinders using the signals from the pressure detection means and acceleration detection means as parameters, and wherein the control means sets a first target pressure difference based on the lateral acceleration signal and controls the flow amount for this target pressure difference.

If the first target value is set based on the lateral acceleration $Y_G$ and flow control is performed for this target value, the rolling continuity and operationability and stability are improved, since the convergence is made faster.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 9 is a graph illustrating the characteristics of the coefficient a;

DESCRIPTION OF THE PREFERRED EMBODIMENTS

Preferred embodiments of the present invention will now be described in detail in accordance with the accompanying drawings.

Figure 1:
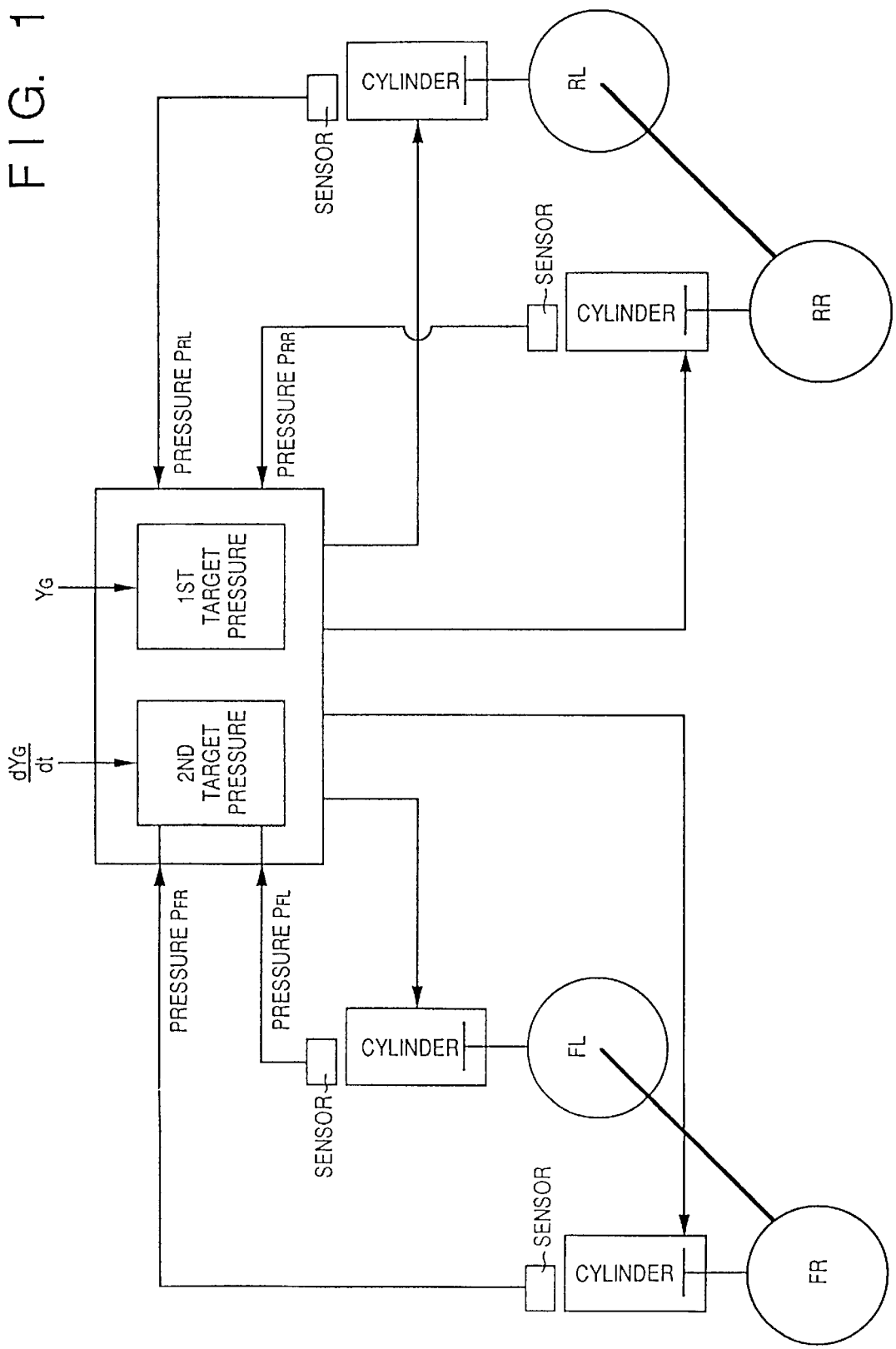
FIG. 1 is a block diagram illustrating the construction of the present invention.
Figure 2:
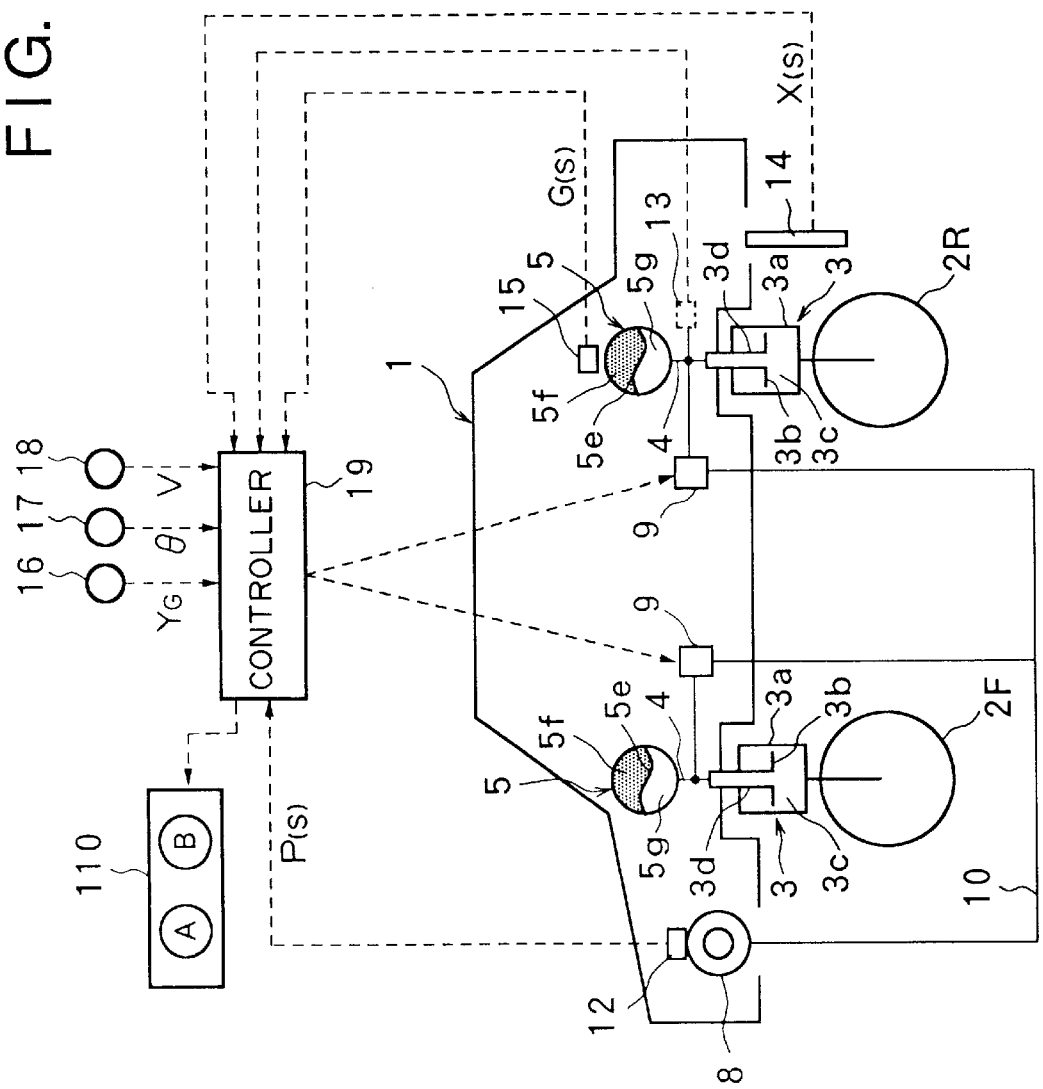
FIG. 2 is a block diagram illustrating a suspension apparatus of an embodiment to which the present invention is applied.
Figure 3:
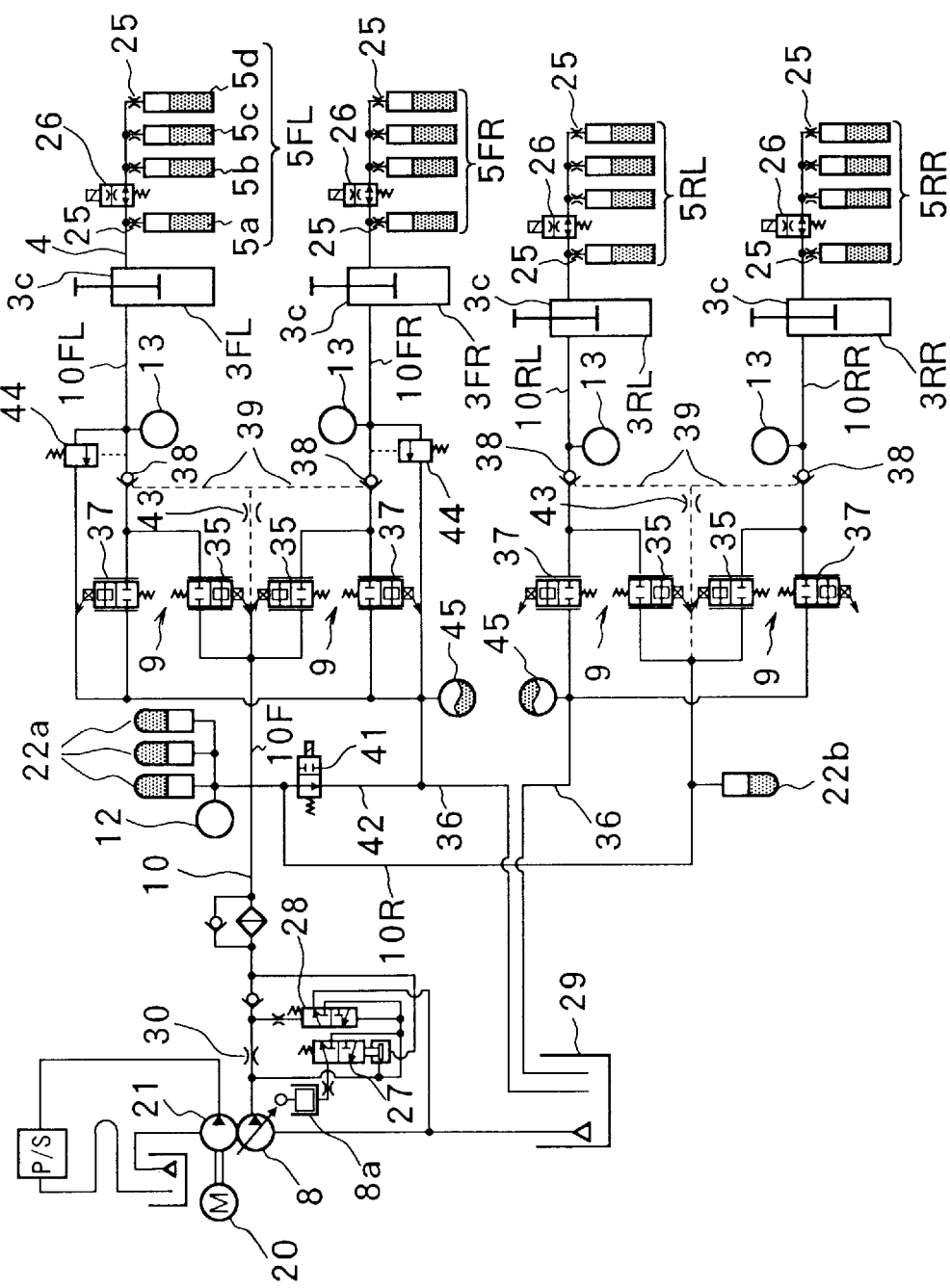
FIG. 3 is a diagram illustrating a hydraulic system of the embodiment of FIG. 2.

FIG. 2 is a diagram illustrating a suspension apparatus according to the preferred embodiment, FIG. 3 is a diagram illustrating a hydraulic circuit of the suspension apparatus of FIG. 2, and FIGS. 4–6 are block diagrams illustrating a control method of the suspension apparatus of FIG. 2.

<General Description of the Operation of the Embodiment>

The features of the preferred embodiment are as follows:

I. In order to improve "continuity" of rolling movement of the vehicle, the flow amounts of the hydraulic cylinders are controlled so that the cylinder pressure at the outer wheel side is higher than that at the inner wheel side in a turning state with the expectation that a pressure difference occurs between a right-wheel cylinder and left-wheel cylinder by the rolling movement control.

II. To execute the above control, the product ($=Y_G \cdot a$) obtained by multiplying the lateral acceleration signal $Y_G$ by a predetermined gain a is subtracted from the difference between the cylinder pressure signals ($P_{FR}-P_{FL}$, $P_{RR}-P_{RL}$; it is assumed that the right rolling is positive).

III. In order to improve the control which increases stability of the movement of the vehicle by improving the continuity of the rolling movement, that is, to improve responsiveness of the control, a time differentiation signal of the lateral G signal $Y_G$ is given greater consideration.

IV. The gain a is set as a small value at low speed, while a large value at high speed. That is, comfortableness is pursued at the low speed, while operationability and stability are pursued at the high speed by making the stability of the vehicle movement faster.

<Construction of the Suspension Apparatus>

The construction of the suspension apparatus of the preferred embodiment is described referring to FIG. 2.

In FIG. 2, numeral 1 is a vehicle body, numeral $2_F$ refers to the front wheels, numeral $2_R$ refers to the rear wheels, hydraulic cylinders 3 are respectively provided between the body 1 and front wheels $2_F$ and rear wheels $2_R$.

Each hydraulic cylinder 3 includes a hydraulic chamber 3c formed into division by a piston 3b which is inserted into the cylinder body 3a. A top end of the rod 3d which connects to each piston 3b is connected to the vehichle body 1 and the cylinder bodies 3a are respectively connected to the front and rear wheels $2_F$, $2_R$.

The hydraulic chamber 3c of the hydraulic cylinder 3 is connected to a pneumatic spring 5 via a connecting path 4. The pneumatic spring 5 includes a pneumatic chamber 5f and hydraulic chamber 5g formed by dividing by a diaphragm 5e. The hydraulic chamber 5g connects to the hydraulic chamber 3c of the hydraulic cylinder 3.

Numeral 8 is a hydraulic pump, numeral 9 is a flow control valve which is provided on a hydraulic path 10 connecting to the hydraulic pump 8 and each hydraulic cylinder 3 by a high pressure oil line. The flow control valve 9 functions to adjust the flow rate by supply and release of fluid (oil) to/from the hydraulic cylinder 3.

Furthermore, numeral 12 is a main pressure sensor which detects an oil discharging pressure of the hydraulic pump 8 and an accumulated pressure within accumulators 22a and 22b (which are described later). Numeral 13 is a cylinder pressure sensor which detects a hydraulic pressure P of the hydraulic chamber 3c of each hydraulic cylinder 3. Numeral 14 represents vehicle-height sensors which detect vehicle heights X(s) (that is, amount of cylinder stroke) of the corresponding wheels $2_F$, $2_R$. Numeral 15 is a vertical acceleration sensor which detects a vertical acceleration (spring acceleration of mass over the wheels $2_F$, $2_R$) and numeral 16 is a lateral acceleration sensor which detects a lateral acceleration $Y_G$. Numeral 17 is a steering angle sensor which detects a steering angle of the front wheels $2_F$, and numeral 18 is a vehicle speed sensor which detects vehicle speed. The detection signals detected by these sensors 12–18 are inputted into a controller 19 containing a CPU and used for variably controlling the characteristic of the suspension.

Numeral 110 is a warning display which is installed in an instrument panel (not shown) viewed at the front sheet. The warning display 110 receives an instruction to light up a lamp from the controller 19, and has two warning lamps. A warning lamp A is lit when a unit of the flow control system has failed, while a warning lamp B is lit when the control of supply and release of flow is suspended by closing a check valve described later.

FIG. 3 is a diagram illustrating a hydraulic circuit which controls supply/release of fluid with respect to the hydraulic cylinder 3. In FIG. 3, the hydraulic pump 8 is comprised of a variable-displacement-type piston pump and is a twin pump with a hydraulic pump 21 for power steering apparatus driven by a driving source 20. Accumulators 22a are connected to a passage 10 connecting to the hydraulic pump 8, and the passage 10 is branched into a front-wheel passage $10_F$ and rear-wheel passage $10_R$. The front-wheel passage $10_F$ is further branched into a left-front-wheel passage $10_{FL}$ and right-front-wheel passage $10_{FR}$. Each of the passages $10_{FL}$ and $10_{FR}$ are respectively connected to the hydraulic chambers 3c of the hydraulic cylinders $3_{FL}$ and $3_{FR}$ of each wheel. The rear-wheel passage $10_R$ is connected to one of the accumulators 22b and is branched into a left-rear-wheel passage $10_{RL}$ and right-rear-wheel passage $10_{RR}$ at the down-stream side. Each of the passages $10_{RL}$ and $10_{RR}$ are respectively connected to the hydraulic chambers 3c of the hydraulic cylinders $3_{RL}$ and $3_{RR}$ of each wheel.

Pneumatic spring units $5_{FL}$, $5_{FR}$, $5_{RL}$, $5_{RR}$ which are respectively connected to the hydraulic cylinders $3_{FL}$, $3_{FR}$, $3_{RL}$, $3_{RR}$, each of which consist of a plurality of springs, for example, four pneumatic springs 5a, 5b, 5c, 5d in the figure. These pneumatic springs 5a, 5b, 5c, 5d are connected to the hydraulic chamber 3c of the hydraulic cylinders 3 via a connecting passage 4 in parallel. The pneumatic springs 5a, 5b, 5c, 5d are respectively provided with an orifice 25 at the branching point of the connecting passage 4, and serve for damping effect and buffer effect. A damping-force switch valve 26 which adjusts an area of passage cutaway is provided between the first pneumatic spring 5a and second pneumatic spring 5b in the connecting passage 4, and has two states such as an open state and a closed state which considerably restricts the area of passage cutaway.

The passage 10 is connected to an unload valve 27 and flow control valve 28 at the upper-stream side of the accumulator 22a. The unload valve 27 has an introducing and discharging states. The introducing state is for introducing pressurized oil discharged from the hydraulic pump 8 into a cylinder 8a and reducing a discharging amount of the hydraulic pump 8. The discharge state is for discharging the oil pressure in the cylinder 8a. The unload valve 27 is arranged so as to switch from the discharge state to the introducing state when the discharge pressure of the hydraulic pump 8 reaches a predetermined maximum pressure (approximately 160 kgf/cm$^2$) and retains this state when the pressure is lower than a predetermined minimum pressure (approximately 120 kgf/cm$^2$). The unload valve 27 functions as a pressure adjusting valve which retains and controls an oil pressure of the hydraulic pump 8 within the predetermined range (120–160 kgf/cm$^2$). The flow control valve 28 also has an introducing state and discharge state. The introducing state is for introducing the oil pressure from the hydraulic pump 8 to the cylinder 8a via the unload valve 27 and the discharge state is for discharging the oil pressure of the cylinder 8a to a reservoir 29. The flow control valve 28 has a function to maintain and control the oil discharge amount of the hydraulic pump 8 to be constant by maintaining the pressure difference between the upper stream and down stream of an orifice 30 of the passage 10.

However, oil is supplied to each hydraulic cylinder 3 by accumulated pressure of the accumulators 22a and 22b. The accumulated pressure of the accumulators 22a and 22b is substantially same as the pressure at the down-stream side of the accumulator of the passage 10 which is the main passage and this is referred to as "main pressure".

On the other hand, the four flow control valves 9 corresponding to each wheel are provided at the down-steam side of the accumulators 22a. Only the construction of the flow control valve 9 of the left-front-wheel side is described since the construction of the corresponding portion of each wheel is the same as that of the flow control valve 9 of the left-front-wheel side.

The flow control valve 9 is comprised of an inflow valve 35 and exhaust valve 37. The inflow valve 35 has two states: Closed state and supplying state capable of changing the degree of openness (open state). The inflow valve 35 is provided in the left-front wheel passage $10_{FL}$ of the passage 10 and the pressurized fluid (oil) accumulated in the accumulator 22a is supplied to the hydraulic cylinder $3_{FL}$ by opening by fine adjustment. Furthermore, the exhaust valve 37 has two states: Close state and releasing or draining state (open state) capable of changing the openness. The exhaust valve 37 is provided in a passage 36 which connects the reservoir 29 to the left-front wheel passage $10_{FL}$, and the fluid supplied to the hydraulic cylinder $3_{FL}$ is exhausted to the reservoir 29 by a fine adjustment. The inflow valve 35 and exhaust valve 37 are spool type valves and respectively contain a differential pressure regulating valve which maintains the hydraulic pressure to a predetermined value at the open state.

A check valve 38 which is responsive to pilot pressure is provided as a poppet isolation valve in the left-front wheel passage $10_{FL}$ between the inflow valve 35 and hydraulic cylinder $3_{FL}$. The check valve 38 is arranged such that the hydraulic pressure (that is, the main pressure or accumulated force in the accumulators 22a, 22b) in the passage 10 at the upper-stream side of the inflow valve 35 is introduced as a pilot pressure by a pilot line 39, and the valve is closed when the pilot pressure is lower than 70 kgf/cm$^2$. That is, when the main pressure is over 70 kgf/cm$^2$, the pressurized oil is supplied to the cylinder 3 and oil is discharged from the cylinder 3.

Numeral 41 is a fail-safe valve which is provided in a passage 42 connecting the down-stream side of the accumulator 22a of the passage 10 and passage 36. The fail-safe valve 41 functions such that accumulated oil of the accumulators 22a and 22b is returned to the reservoir 29 by switching the fail-safe valve 41 to the open state at the failure and the high-pressured state is released. Furthermore, numeral 43 is an orifice provided in the pilot line 39 and functions so as to delay closing the check valve 38 when the fail-safe valve 41 is opened. Numeral 44 is a relief valve which returns oil to the passage 36 when the oil pressure of the hydraulic chamber 3c of each hydraulic cylinder $3_{FL}$, $3_{FR}$ is abnormally increased. Numeral 45 is a return accumulator connected to the passage 36 which accumulates the pressure when the oil is discharged from the hydraulic cylinder 3.

<Construction of the Controller 19>

A flow control to each cylinder 3 by the controller 19 will be described based on FIGS. 4 through 6.

Figure 4:
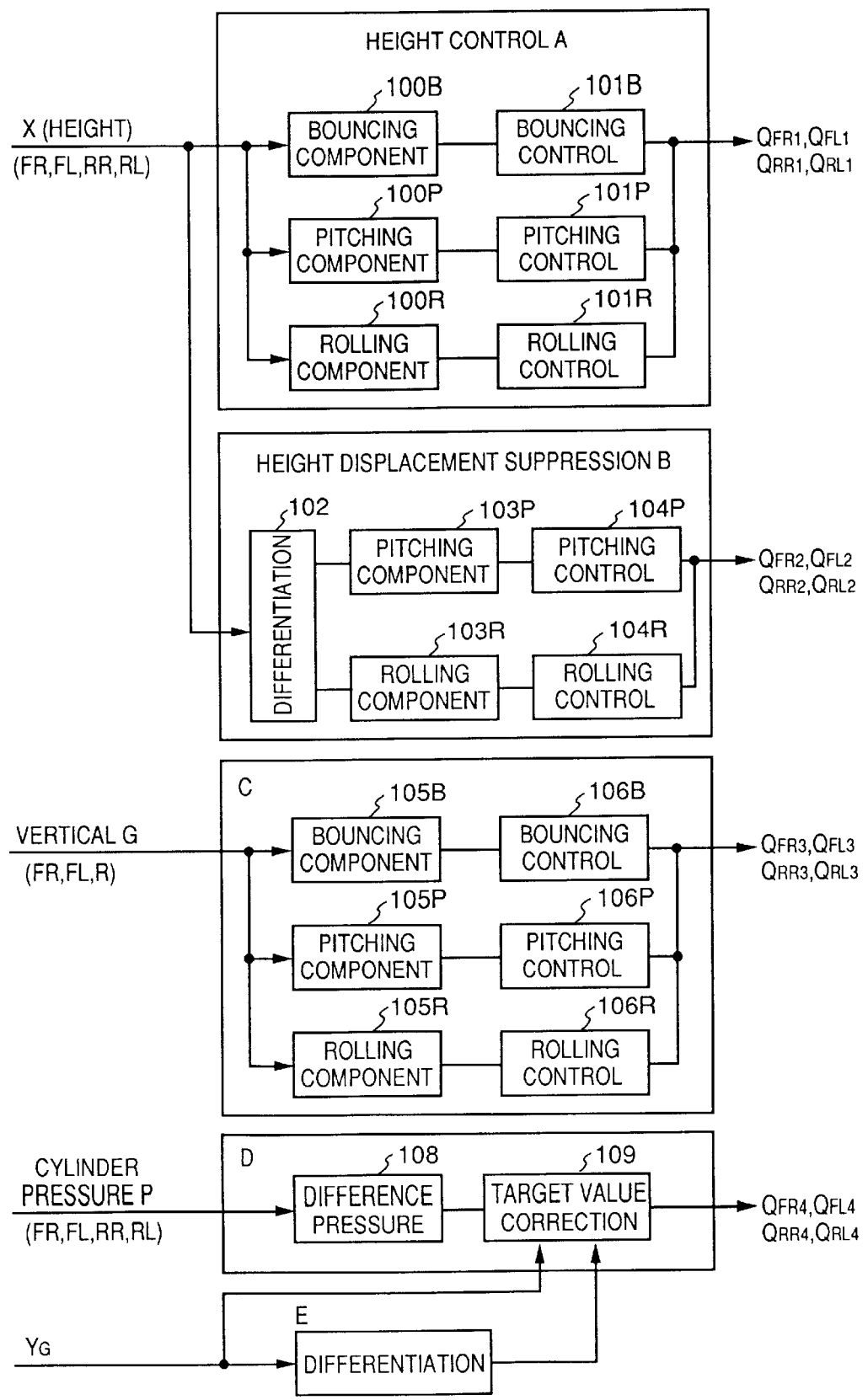
FIG. 4 is a block diagram illustrating a general construction of a control system function of the embodiment.

FIG. 4 is a diagram for explaining the theory of generating a control signal Q to control the flow amount to each cylinder 3. As shown in FIG. 4, the flow control by the controller 19 comprises of a vehicle-height control subsystem A, vehicle-height displacement suppression subsystem B, vertical acceleration suppression subsystem C, and warp/twist correction subsystem D. These subsystems generate flow control signals $Q_1$, $Q_2$, $Q_3$, $Q_4$ respectively. These signals are summed up at every wheel, and the sum is determined as control signals ($Q_{FR}$, $Q_{FL}$, $Q_{RR}$, $Q_{RL}$) for the wheel.

The control in each subsystem will be described in general with reference to FIG. 4.

In the vehicle-height control subsystem A, calculators $100_B$, $100_P$, $100_R$ calculate and generate a bouncing component, pitching component, and rolling component, respectively, of a vehicle displacement from four vehicle height signals Xs from the four height sensors 14 at the four wheels. Each of the calculators $101_B$, $101_P$, $101_R$ calculates a flow control signal based on the bouncing component, the rolling component, and the pitching component, respectively. The flow control signals calculated based on the three components are summed up in each wheel, and outputted as $Q_{FR1}$, $Q_{FL1}$, $Q_{RR1}$, $Q_{RL1}$.

In the vehicle-height displacement suppression subsystem B, a differentiator 102 differentiates the four height signals, calculators $103_P$ and $103_R$ extract a pitching component and rolling component, respectively, from the differentiated signals, and calculator $104_P$ and $104_R$ calculate flow control signals based on the pitching component and rolling component, respectively. The flow control signals based on the calculated two components are summed up in each wheel, and outputted as $Q_{FR2}$, $Q_{FL2}$, $Q_{RR2}$, $Q_{RL2}$.

In the vertical acceleration suppression subsystem C, calculators $105_B$, $105_P$, $105_R$ calculate and generate a bouncing component, pitching component, and rolling component, respectively, from the acceleration signals $G_{FR}$, $G_{FL}$, $G_R$ from the three acceleration sensors 15 which are respectively mounted at the front-right wheel, front-left wheel, and a midpoint between of the rear wheels. Calculators $106_B$, $106_P$, $106_R$ calculate flow control signals on the bouncing component, the pitching component, and the rolling component respectively. The flow control signals of the calculated three components are integrated in each wheel and outputted as $Q_{FR3}$, $Q_{FL3}$, $Q_{RR3}$, $Q_{RL3}$.

In the subsystem D, a calculator 108 calculates a pressure difference ($P_{FR}-P_{FL}$ and $P_{RR}-P_{RL}$) between the right cylinder and left cylinder based on each pressure signal P in the four hydraulic cylinders. The calculator 108 calculates so as to generate a control amount such that the pressure difference between the right and left cylinder becomes zero. Furthermore, a corrector 109 corrects the control amount so that the pressure difference between the right and left cylinder becomes zero based on the lateral G signal $Y_G$ and differential signal $dY_G/dt$. The corrected control signals are outputted as $Q_{FR4}$, $Q_{FL4}$, $Q_{RR4}$, $Q_{RL4}$. The features I–III of the embodiment are executed by the subsystem D and the detail of the subsystem D will be described later.

Figure 5:
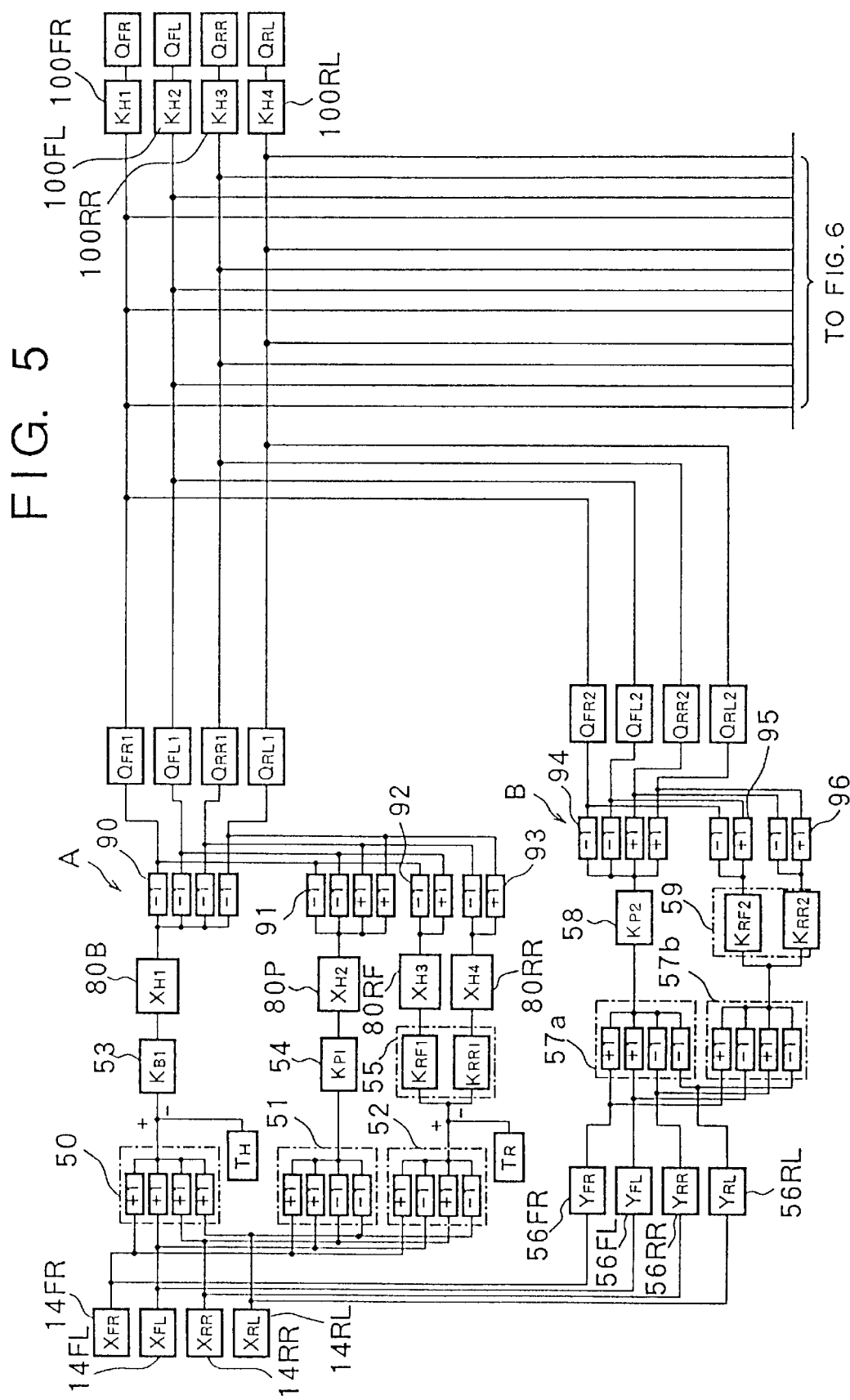
FIG. 5 is a diagram illustrating a detailed construction of the control system of the embodiment.
Figure 6:
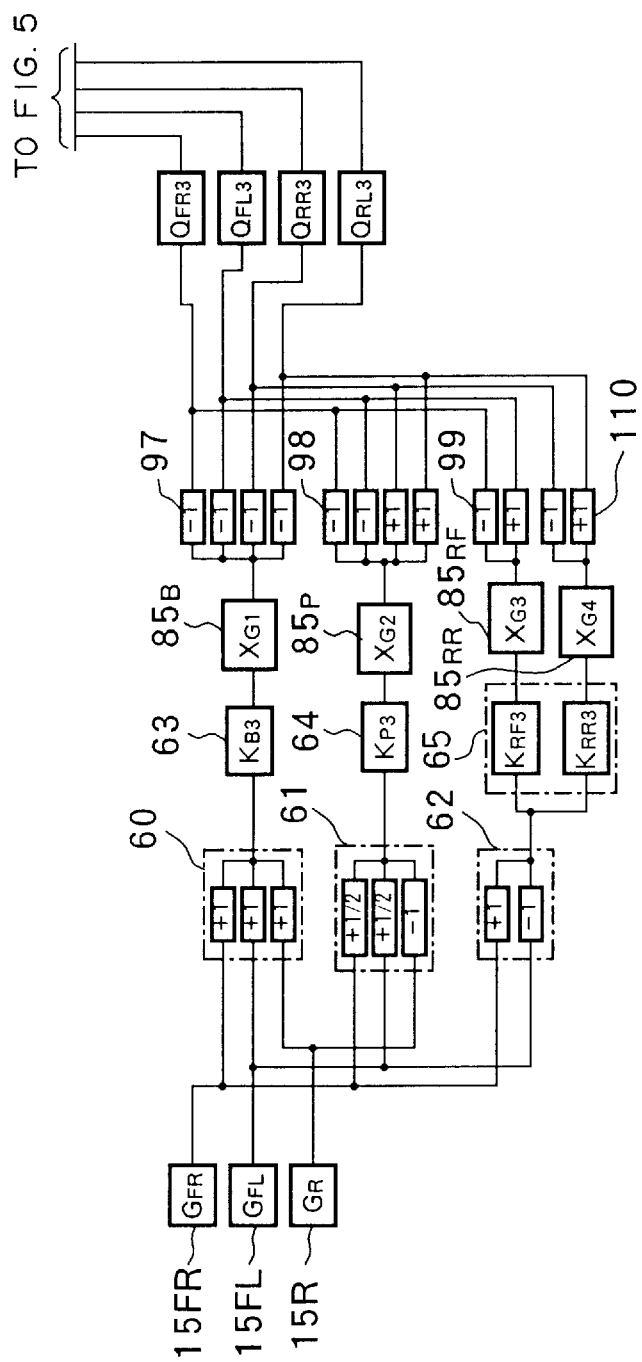
FIG. 6 is a diagram illustrating the detailed construction of the control system of the embodiment.

The control by the controller 19 which is generally described along with FIG. 4 will be further described in detail based on FIGS. 5 and 6.

As described above, the control of the controller 19 comprises the vehicle-height control subsystem A, vehicle-height displacement suppression subsystem B, vertical acceleration suppression subsystem C, warp/twist correction subsystem D, and rolling correction subsystem E. The vehicle-height control subsystem A controls the vehicle height to be a target height based on the height signals $X_{FR}$, $X_{FL}$, $X_{RR}$, $X_{RL}$ of the height sensors $14_{FR}$, $14_{FL}$, $14_{RR}$, $14_{RL}$. The vehicle-height displacement suppression subsystem B suppresses the vehicle-height displacement based on vehicle-height displacement acceleration signals $Y_{FR}$, $Y_{FL}$, $Y_{RR}$, $Y_{RL}$ obtained from the vehicle-height signals X. The vertical acceleration suppression system C reduces vibration of the vehicle based on the vertical acceleration signals $G_{FR}$, $G_{FL}$, $G_{RR}$, $G_{RL}$ of the three cylinder pressure sensors $15_{FR}$, $15_{FL}$, $15_R$. The warp/twist correction subsystem D determines a target vehicle-height $H_T$ based on the pressure signals $P_{FR}$, $P_{FL}$, $P_{RR}$, $P_{RL}$ of the cylinder pressure sensors $13_{FR}$, $13_{FL}$, $13_{RR}$, $13_{RL}$ of each wheel. The rolling correction subsystem E corrects the rolling based on the lateral acceleration signal $Y_G$ of the lateral acceleration sensor 16.

Vehicle-Height Control Subsystem

In the control subsystem A, numeral 50 is a bouncing component calculator (corresponding to $100_B$ in FIG. 4). The bouncing component is obtained by summing up the outputs $X_{FR}$ and $X_{FL}$ of the right- and left-front wheels $2_F$ and the outputs $X_{RR}$ and $X_{RL}$ of the right and left rear wheels $2_R$ out of the height signals $X_{FR}$, $X_{FL}$, $X_{RR}$, $X_{RL}$ of the four height sensors $14_{FR}$, $14_{FL}$, $14_{RR}$, $14_{RL}$. That is, the bouncing component calculator 50 calculates:

Bouncing Component=$X_{FR}+X_{FL}+X_{RR}+X_{RL}$ Numeral 51 is a pitching component calculator (corresponding to $100_P$ in FIG. 4). The pitching component is obtained by subtracting the outputs $X_{RR}$ and $X_{RL}$ of the right- and left-rear wheels $2_F$ from the sum of $X_{FR}$ and $X_{FL}$ of the right- and left-front wheels $2_F$. That is, the pitching component calculator 51 calculates:

Pitching Component=$(X_{FR}+X_{FL})-(X_{RR}+X_{RL})$

Numeral 52 is a rolling component calculator (corresponding to $100_R$ in FIG. 4). The rolling component is obtained by adding the difference between the outputs of the right- and left-front wheels $2_F$ ($X_{FR}-X_{FL}$) and the difference between the outputs of the right- and left-rear wheels $2_R$ ($X_{RR}-X_{RL}$). That is, the rolling component calculator 52 calculates:

Rolling Component=$(X_{FR}-X_{FL})+(X_{RR}-X_{RL})$

Numeral 53 is a bouncing-amount calculator (corresponding to $101_B$ in FIG. 4) which inputs a bouncing component calculated by the bouncing component calculator 50 and the target height $T_H$, and calculates a control variable for the bouncing control of the flow control valve 9 based on the gain coefficient $K_{B1}$. Numeral 54 is a pitching-amount calculator (corresponding to $101_P$ in FIG. 4) which inputs a pitching component calculated by the pitching component calculator 51 and calculates a control variable for the pitching control based on the gain coefficient $K_{P1}$. Numeral 55 is a rolling-amount calculator (corresponding to $101_R$ in FIG. 4) which inputs a rolling component calculated by the rolling displacement component calculator 52 and target rolling displacement $T_R$, and calculates a control variable for the bouncing control based on the gain coefficients $K_{FR1}$, $K_{RR1}$ so as to correspond to the target rolling displacement $T_R$.

Each of the control variables calculated by the calculators 53, 54, 55 are inverted in their signs in every wheel (inverted so as to be opposite to the signs of the height displacement signal of the height sensor 14), a control variable of the bouncing, pitching, rolling are respectively added in the subsystem A, flow signal $Q_{FR1}$, $Q_{FL1}$, $Q_{RR1}$, $Q_{RL1}$ of flow control valve 9 are obtained.

More specifically, the calculators 90 output a control signal whose signs are all inverted from the control variables which have been calculated by the calculator 53. The control signal will serve to suppress bouncing at each wheel. Furthermore, an adder 91 outputs a control signal which controls a pitching movement between the front and rear wheels by adding the signals whose signs are opposite to the signs added in the calculator 51 to the signals calculated by the calculator 54 (that is, the opposite signs of the front wheels are given to the rear wheels). Adders 92, 93 generate control signals which suppress the rolling between the right and left wheels by adding the signals whose signs are opposite to the signs obtained by the calculator 52 to the control signals calculated by the calculator 55.

Low pass filters $80_B$ (for bouncing), $80_P$ (for pitching), $80_{RF}$ (for the front wheel rolling), and $80_{RR}$ (for the rear wheel rolling) are provided between the calculators 53, 54, 55 and the adders 90, 91, 92, 93, respectively. When a control signal calculated by the calculators 53, 54, 55 are larger than the predetermined cut-off frequencies $X_{H1}$, $X_{H2}$, $X_{H3}$, $X_{H4}$, these low pass filters cut off the control signal and output the signal whose frequency is less than $X_{H1} \sim X_{H4}$.

Vehicle-Height Displacement Suppression System

The detail of the subsystem B will be described with reference to FIG. 5. In the subsystem B, the height signals $X_{FR}$, $X_{FL}$, $X_{RR}$, $X_{RL}$ from the height sensors $14_{FR}$–$14_{RL}$ are inputted into differentiators $56_{FR}$, $56_{FL}$, $56_{RR}$, $56_{RL}$ and differentiated components of the height signals $X_{FR}$, $X_{FL}$, $X_{RR}$, $X_{RL}$ from each $56_{FR}$–$56_{RL}$, that is, the height displacement acceleration signal $Y_{FR}$, $Y_{FL}$, $Y_{RR}$, $Y_{RL}$ can be obtained. Furthermore, the height displacement acceleration signal Y is obtained from:

$Y=(Xn-X_{n-1})/T$

Xn: Vehicle-height displacement of the time t $X_{n-1}$: Vehicle-height displacement of the time t−1

T: Sampling duration

Numeral 57a of FIG. 5 is a pitching component calculator (corresponding to $103_P$ in FIG. 4) which calculates a pitching component by subtracting the sum of the outputs $Y_{RR}$, $Y_{RL}$ of the height displacement acceleration of the rear wheels $2_R$ from the sum of the height-displacement acceleration of the front wheels $2_F$. That is, the pitching component calculator 57a calculates:

Pitching component of the vehicle displacement=$(Y_{FR}+Y_{FL})-(Y_{RR}+Y_{RL})$ Numeral 57b is a rolling component calculator (corresponding to $103_R$ in FIG. 4) which calculates a rolling component by adding the difference $Y_{FR}-Y_{FL}$ of the height displacement acceleration of the front wheels and the difference $Y_{RR}-Y_{RL}$ of the height displacement acceleration of the rear wheels. That is, the rolling component calculator 57b calculates:

Rolling component of vehicle displacement=$(Y_{FR}-Y_{FL})+(Y_{RR}-Y_{RL})$

Furthermore, numeral 58 is a pitching-amount calculator (corresponding to $104_P$ in FIG. 4) which inputs a pitching component calculated by the pitching component calculator 57a and calculates a control variable of each flow control valve 9 of the pitching control based on the gain coefficient $K_{P2}$. Numeral 59 is a rolling-amount calculator (corresponding to $104_R$) which inputs a rolling component calculated by the rolling component calculator 57b and calculates a control variable of each flow control valve 9 of the rolling control based on the gain coefficients $K_{FR2}$, $K_{RR2}$.

Each of the control variables respectively calculated by controllers 58 and 59 is inverted in each wheel (inverted so as to be opposite in sign of the height displacement acceleration signal of the differentiators $56_{FR}$–$56_{RL}$) and each of the pitching control amount and rolling control amount is added. Thus, the flow control signals $Q_{FR2}$, $Q_{FL2}$, $Q_{RR2}$, $Q_{RL2}$ of the flow control valve 9 are obtained.

Vertical Acceleration Suppression System

In the subsystem C of FIG. 6, numeral 60 is a bouncing component calculator (corresponding to $105_B$ in FIG. 4) which sums up outputs $G_{FR}$, $G_{FL}$, $G_R$ of the three vertical acceleration sensors $15_{FR}$, $15_{FL}$, $15_R$ and calculates:

Bouncing component of vertical G=$G_{FR}+G_{FL}+G_R$.

Numeral 61 is a pitching component calculator (corresponding to $105_P$ in FIG. 5) which subtracts the output $G_R$ of the rear wheel $2_R$ from the sum of a half of the output $G_{FR}$ and half of the output $G_{FL}$ of the front wheels, and calculates:

Pitching component of vertical G=½ $(G_{FR}+G_{FL})-G_R$

Numeral 62 is a rolling component calculator (corresponding to $105_R$ in FIG. 4) which subtracts the output $G_{FL}$ of the left-front wheel from the output $G_{FR}$ of the right-front wheel, and calculates:

Rolling component of vertical G=$G_{FR}-G_{FL}$

Furthermore, numeral 63 is a bouncing amount calculator (corresponding to $106_B$ in FIG. 4) which inputs the bouncing component calculated by the calculator 60 and calculates a control variable with respect to the flow control valve 9 of each wheel for the bouncing control based on the gain coefficient $K_{B3}$. Numeral 64 is a pitching amount calculator (corresponding to $106_P$ in FIG. 4) which inputs the pitching component which is calculated by the pitching 15 component calculator 61 and calculates a control variable with respect to the flow control valve 9 in the pitching control based on the gain coefficient $K_{P3}$. Numeral 65 is a rolling component calculator (corresponding to $106_R$ in FIG. 4) which inputs the rolling component which is calculated by the rolling component calculator 62 and calculates a control variable in the rolling control based on the gain coefficients $K_{RF3}$, $K_{RR3}$.

Each control variable which is calculated in the 25 calculators 63, 64, 65, so as to suppress the vertical displacement of the vehicle by the bouncing component, pitching component, and rolling component, is inverted at each wheel. Each control variable of the bouncing, pitching, rolling component is added with respect to each wheel, and the flow control signals $Q_{FR3}$, $Q_{FL3}$, $Q_{RR3}$, $Q_{RL3}$ are obtained in the subsystem C.

Low pass filters $85_B$ (for bouncing), $85_P$ (for pitching), $85_{RF}$ (for the front-wheel rolling) $85_{RR}$ (for the rear-wheel rolling) are provided between the calculators 63, 64, 65 and adders 97, 98, 99, 111. When the control signals calculated by the calculators 63, 64, 65 are larger than the predetermined number of cut-off frequencies $X_{G1}$, $X_{G2}$, $X_{G3}$, $X_{G4}$, the control signals are cut off and only signals whose cut-off frequencies are below $X_{G1}$~$X_{G4}$ are outputted.

Rolling Correction Control Subsystem

The control subsystem D will be described with reference to FIG. 7. The signals which are inputted into the subsystem D are pressure signals of respective cylinder (that is, hydraulic pressure signals $P_{FR}$, $P_{FL}$ from the two cylinder pressure sensors $13_{FR}$, $13_{FL}$ of the front wheels and hydraulic pressure signals $P_{RR}$, $P_{RL}$ from the two cylinder pressure sensors $13_{RR}$, $13_{RL}$ of the rear wheels), and output signals are flow control signals ($Q_{FR4}$, $Q_{FL4}$, $Q_{RR4}$, $Q_{RL4}$). These hydraulic pressure signals are filtered by filters having a predetermined cut-off frequency ($X_{P1}$, $X_{P2}$, $X_{P3}$, $X_{P4}$) and inputted into the calculators 70a and 70b. In the calculators 70a and 70b, a pressure difference ($P_{FR}-P_{FL}$) between the right-front wheel and left-front wheel and a pressure difference ($P_{RR}-P_{RL}$) between the right-rear wheel and left-rear wheel are calculated respectively.

On the other hand, the lateral G signal $Y_G$ is cut off at the cut-off frequency $X_G$ which is predetermined by a low pass filter 130. Numeral 131 is a delay element. A signal $Y_{Gn+1}$ before delay and the signal $Y_{Gn}$ after the delay are inputted into a subtractor 132. That is, the delay 131 and subtractor 132 comprise a differentiator. If the differentiated signal is expressed by $dY_G/dt$, a signal in an adder 136 is:

$$Y_G \cdot K_{G5} + dY_G/dt \cdot K_{G6} \tag{1}$$

Figure 9:
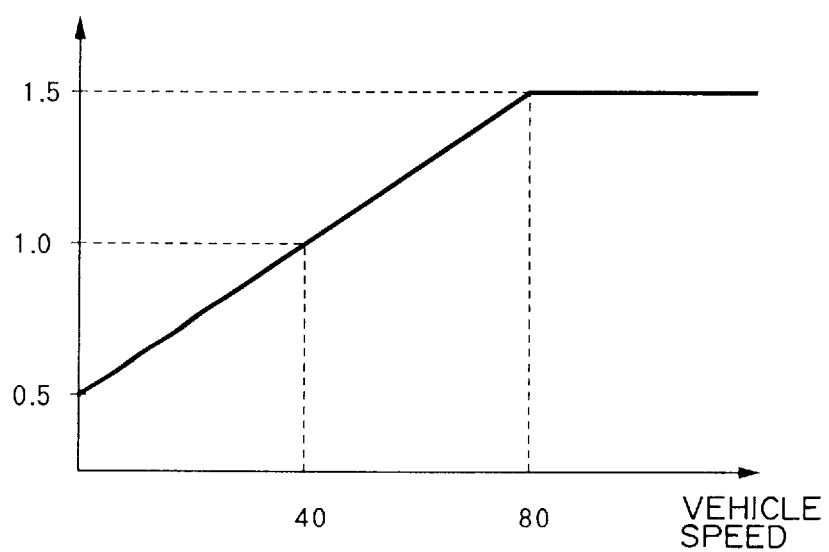
Figure 10:
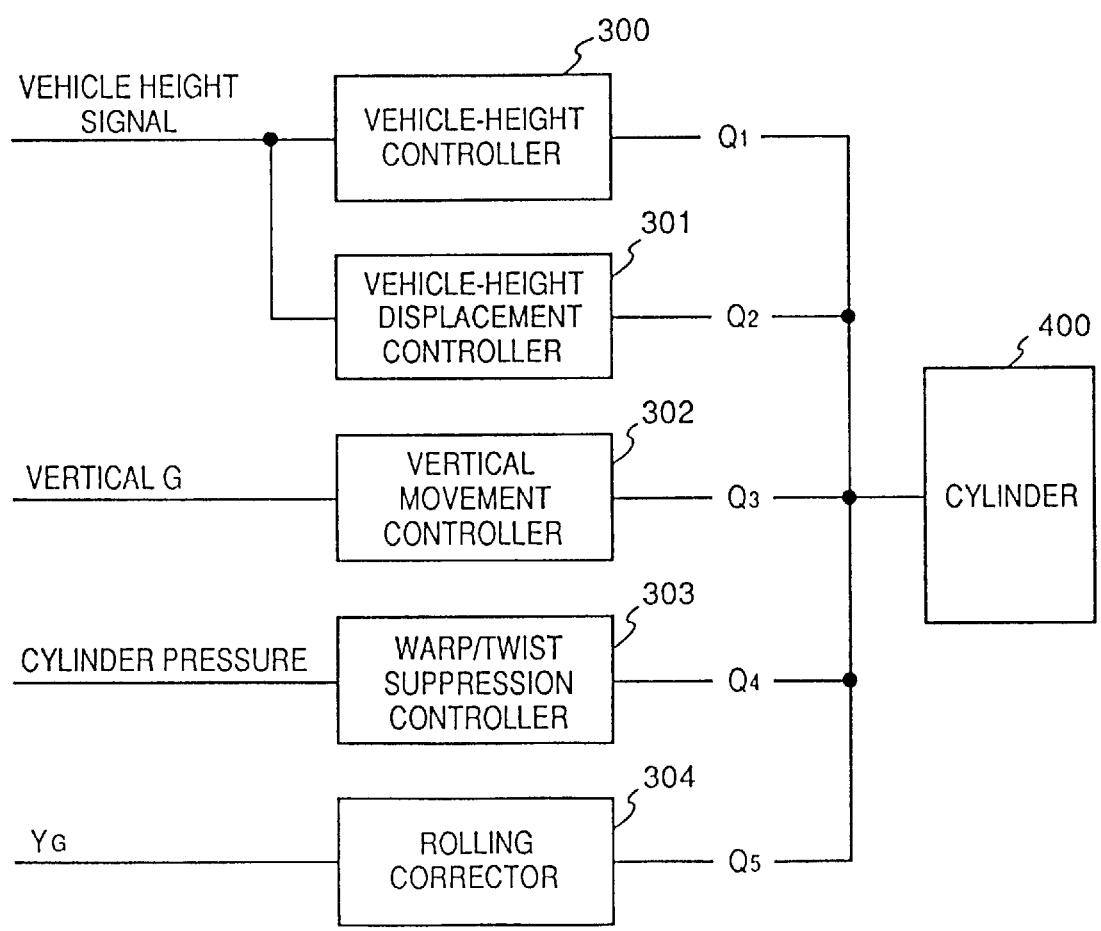
FIG. 10 is a diagram illustrating the construction of the conventional control system.
Figure 11:
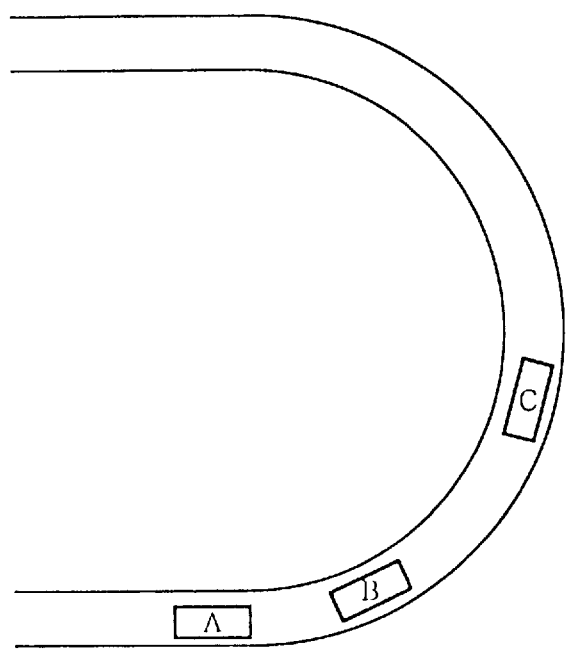
FIG. 11 is a diagram for explaining the reason why the problem is generated by the conventional technique.
Figure 12:
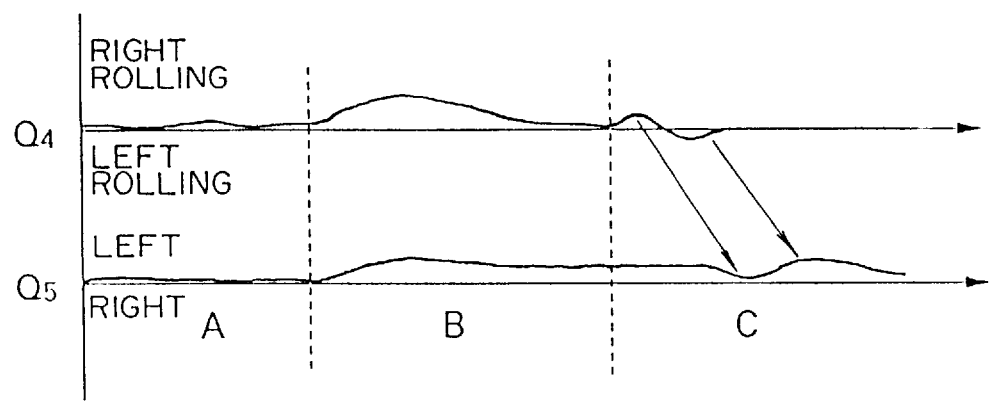
FIG. 12 is another diagram for explaining the reason why the problem is generated by the conventional technique.

$K_{G5}$ and $K_{G6}$ are predetermined gain coefficients. Numerals 137a and 137b are predetermined gains and their values are $K_F \cdot a$ and $K_R \cdot a$ respectively. The characteristics of a are shown in FIG. 9. Furthermore, $K_F$ and $K_R$ are coefficients for the front wheels and the rear wheels, respectively. In order to prevent an over-steered state, it is set that:

front wheel coefficient<rear wheel coefficient

Accordingly, the signals which are inputted to the minus side of adders 150a and 150b are respectively:

$$(Y_G \cdot K_{G5} + dY_G/dt \cdot K_{G6}) \cdot K_F \cdot a \tag{2}$$

$$(Y_G \cdot K_{G5} + dY_G/dt \cdot K_{G6}) \cdot K_R \cdot a \tag{3}$$

Accordingly, the outputs of the adder 150a and 150b are respectively:

$$(P_{FR}-P_{FL})-(Y_G \cdot K_{G5}+dY_G/dt \cdot K_{G6}) \cdot K_F \cdot a \tag{4}$$

$$(P_{RR}-P_{RL})-(Y_G \cdot K_{G5}+dY_G/dt \cdot K_{G6}) \cdot K_R \cdot a \tag{5}$$

These outputs are respectively multiplied by gains $K_{G7}$, $K_{G8}$ in 151a, 151b and whose signs are inverted by 152a, 152b, 153a, 153b. The meaning of the formulas (4) and (5) will be considered below.

If the term ($Y_G \cdot K_{G5}+dY_G/dt \cdot K_{G6}$) of the formulas (4) and (5) does not exist, the flow control signal $Q_4$ is a signal so as to control the pressure difference between the right cylinder and left cylinder (the difference between $P_{FR}-P_{FL}$ and $P_{RR}-P_{RL}$) becomes zero. However, in the formulas (4) and (5), if $(Y_G \cdot K_{G5}+dY_G/dt \cdot K_{G6}) \cdot K_F \cdot a$ and $(Y_G \cdot K_{G5}+dY_G/dt \cdot K_{G6}) \cdot K_R \cdot a$ are subtracted from $(P_{FR}-P_{FL})$ and $(P_{RR}-P_{RL})$ respectively, the following pressure differences are allowed:

$$(P_{FR}-P_{FL})=(Y_G \cdot K_{G5}+dY_G/dt \cdot K_{G6}) \cdot K_F \cdot a \qquad (6)$$

$$(P_{RR}-P_{RL})=(Y_G \cdot K_{G5}+dY_G/dt \cdot K_{G6}) \cdot K_R \cdot a \qquad (7)$$

Accordingly, the above pressure differences are not corrected by the rolling control. In other words, since the pressures at the outer wheels are higher than those at the inner wheels in the turning drive, if these pressure differences are allowed and the above cylinder pressure control considering the lateral acceleration is performed, the continuity of rolling movement in the turning operation is improved. This is because needless rolling control will not be performed. That is, in the conventional technique, the control based on the pressure difference and the control based on the lateral G signal interfere with each other, resulting in hunting state of the rolling control and deterioration of the rolling continuity. However, in the embodiment, since needless rolling control is not performed, the continuity is smoother.

Figure 7:
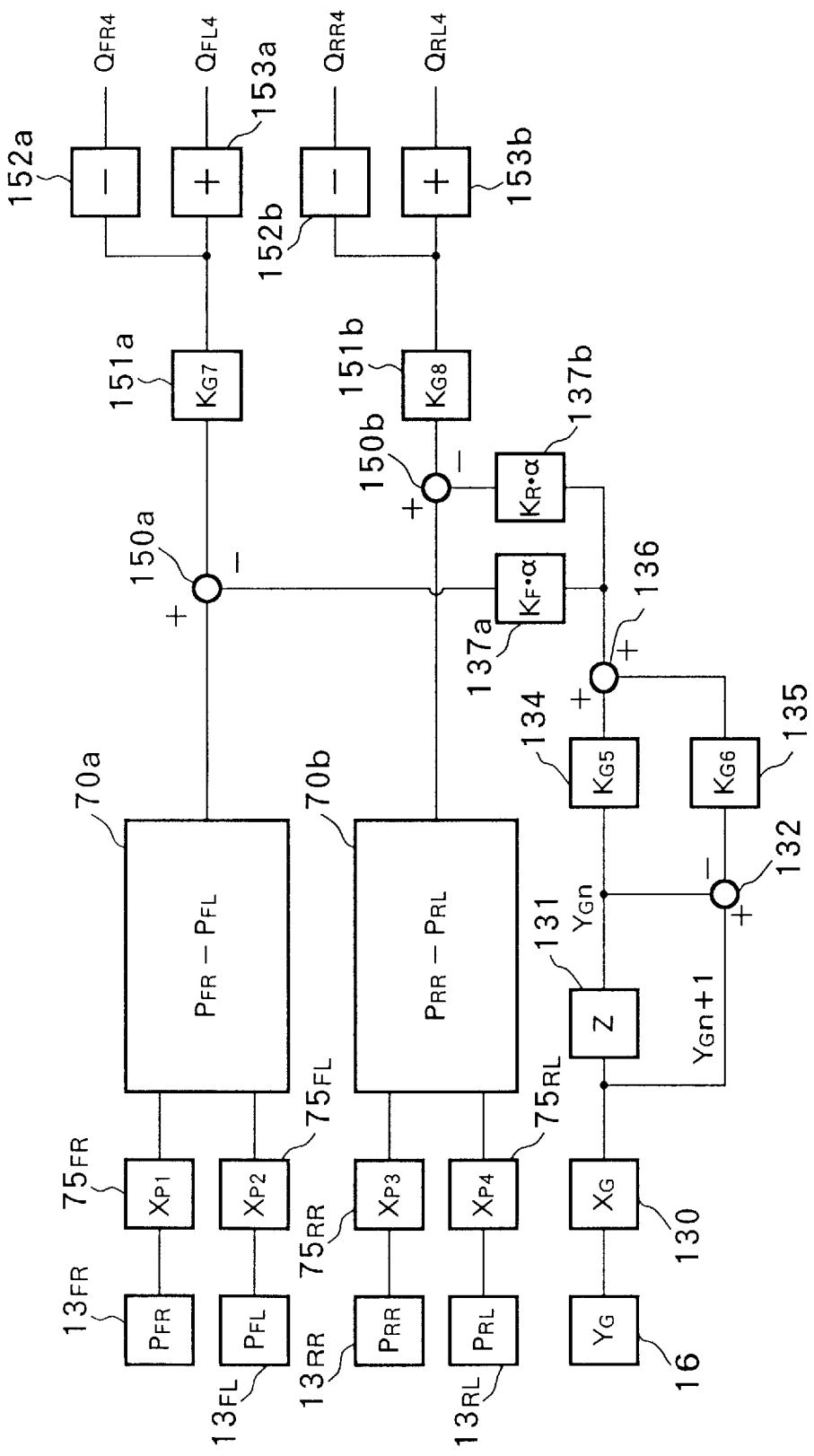
FIG. 7 is a block diagram illustrating a rolling correction control subsystem D of the embodiment.
Figure 8:
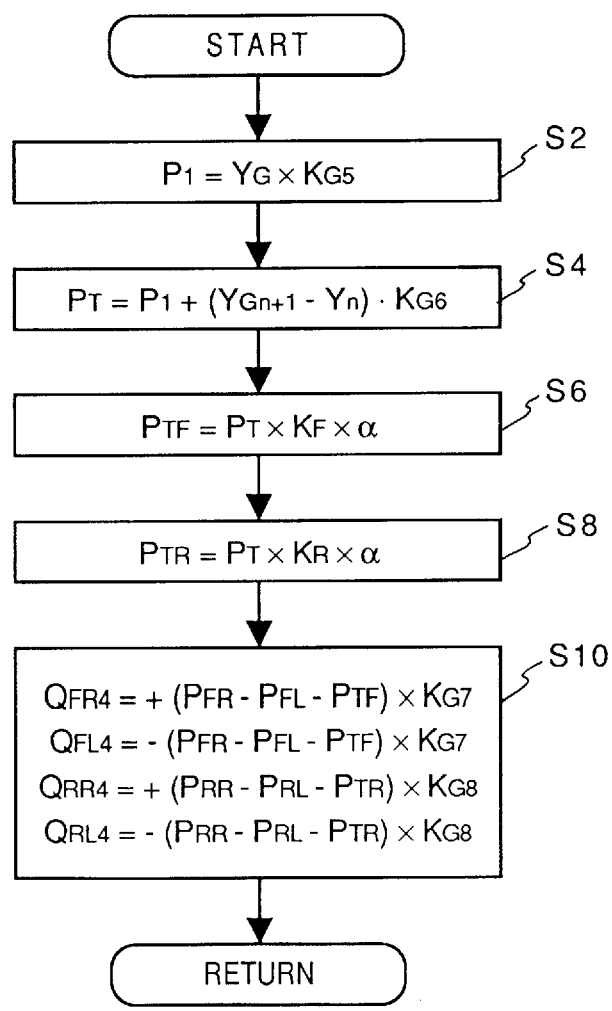
FIG. 8 is a flowchart of the control procedure of the rolling correction control subsystem D.

FIG. 8 is a flowchart of the control procedure when the operation shown in FIG. 7 is executed based on the control of a microcomputer. The operation of step S2 is the same as that of the gain setter 134. It is assumed that the output of the gain setter 134 is $P_1$. The operation of step S4 is the same as that of the adder 136. At step S6, a target value $P_{TF}$ of the front-wheel side is calculated as follows:

$$P_{TF}=P_T \cdot K_F \cdot a$$

At step S8, a target value $P_{TR}$ of the rear wheels is calculated as follows:

$$P_{TR}=P_T \cdot K_R \cdot a$$

The operations at steps S6 and S8 are the same as those of the gain setters 137a and 137b. At step S10, the flow control signals $Q_4$ in each cylinder are respectively determined as, follows:

$$Q_{FR4}=+(P_{FR}-P_{FL}-P_{TF}) \cdot K_{G7}$$

$$Q_{FL4}=-(P_{FR}-P_{FL}-P_{TF}) \cdot K_{G7}$$

$$Q_{RR4}=+(P_{RR}-P_{RL}-P_{TF}) \cdot K_{G8}$$

$$Q_{RL4}=-(P_{RR}-P_{RL}-P_{TF}) \cdot K_{G8}$$

The same effects can be obtained either from the suspension control by the hardware shown in FIG. 7 or the suspension control by the software in FIG. 8. However, the second feature of the embodiment such as the suspension control by the software is to make faster the convergence of the rolling suppression control by setting the target value $P_T$ based on the lateral acceleration $Y_G$ when the rolling movement of the vehicle body is in transient.

FIG. 9 illustrates the characteristics of the coefficient a. The coefficient a is set to be a-large value at the high speed, while a small value at the low speed. This arrangement is to pursue steering stability by increasing the convergence of the rolling control at the high speed, while increasing comfort by reducing the gain at the low speed.

As many apparently widely different embodiments of the present invention can be made without departing from the spirit and scope thereof, it is to be understood that the invention is not limited to the specific embodiments thereof except as defined in the appended claims.

What is claimed is:

1. A suspension apparatus for a vehicle capable of suppressing rolling movement by controlling resistance forces generated by hydraulic cylinders which are respectively provided between a vehicle body and right and left wheels of the vehicle, comprising:

pressure detection means for detecting a pressure in objective hydraulic cylinders, the objective hydraulic cylinders being provided on the front right and front left wheels, or rear right and rear left wheels, and involved in a rolling movement of the vehicle body;

acceleration detection means for detecting a lateral acceleration of the vehicle body; and control means for setting a first target value of pressure difference in pressure of the objective hydraulic cylinders based on pressures detected by the pressure detection means, and controlling a resistance force generated by each of said objective hydraulic cylinders so that a pressure difference of the objective hydraulic cylinders becomes the set first target value, wherein the control means sets the first target value to a first value in a case where a lateral acceleration detected by the acceleration detection means is substantially large and to a second value in a case where a lateral acceleration detected by the acceleration detection means is substantially small, the first value being larger than the second value.

2. The suspension apparatus according to claim 1, wherein said control means further comprises:

means for calculating a second target value of pressure different based on a pressure difference between objective hydraulic cylinders of a right wheel and a left wheel of front or rear wheels; and means for determining a final target value of pressure difference for the objective cylinders by subtracting the first target value of pressure difference from the second target value of pressure difference.

3. The suspension apparatus according to claim 1, wherein said control means further comprises input means for inputting a vehicle speed, and calculates the first target value of pressure difference using the vehicle speed as another parameter.

4. The suspension apparatus according to claim 1, wherein said control means further comprises means for setting a predetermined gain with respect to the first target value of pressure difference, and the characteristic of the predetermined gain is a high value at high speed range, and a low value at low speed range.

5. The suspension apparatus according to claim 1, wherein said control means sets a front target value of pressure difference for cylinders of the front-right and front-left wheels, and a rear target value of pressure difference for cylinders of the rear-right and rear-left wheels, and further comprises:

means for applying a front control gain to the front target value and a rear control gain to the rear target value, the front control gain being smaller than the rear control gain.

6. The suspension apparatus according to claim 1, wherein the vehicle includes four wheels, and said control means sets said first target value for pressure differences between front right and left wheels, and rear right and left wheels, respectively and independently.

7. A suspension apparatus for a vehicle capable of changing a characteristic of suspension by controlling resistance forces generated by hydraulic cylinders which are respectively provided between a vehicle body and right and left wheels of the vehicle comprising:

pressure detection means for detecting a pressure in the hydraulic cylinders;

acceleration detection means for detecting a lateral acceleration of the vehicle body, and calculating a change of the lateral acceleration with respect to time;

control means for setting a first target value of pressure difference between the objective cylinders based on the pressures detected by the pressure detection means and the change of lateral acceleration with respect to time, and controlling a resistance force generated by each of two control-objective cylinders of said hydraulic cylinders so that a pressure difference between the objective cylinders becomes the set first target value, wherein the control means sets the first target value to a first value in a case where a lateral acceleration detected by the acceleration detection means is substantially large and to a second value in a case where a lateral acceleration detected by the acceleration detection means is substantially small, said first value being larger than the second value.

8. A suspension apparatus for vehicles capable of suppressing rolling movement by controlling resistance forces generated by at least two hydraulic cylinders which are provided between a vehicle body and each of right and left wheels of the vehicle, comprising:

pressure detection means for detecting a pressure in objective hydraulic cylinders, the objective hydraulic cylinders being provided on the front right and front left wheels, or rear right and rear left wheels, and involved in a rolling movement of the vehicle body;

setting means for setting a first target value of pressure difference between pressures of the objective hydraulic cylinders, the first target value of pressure difference being determined based on a detected pressure difference of the objective hydraulic cylinders;

acceleration detection means for detecting a lateral acceleration of the vehicle body;

correction means for correcting the first target value of pressure difference based on the detected lateral acceleration; and control means for controlling resistance forces generated in said objective hydraulic cylinders so that a pressure difference between pressures of the objective hydraulic cylinders goes toward the target value of pressure difference, wherein the correction means corrects the first target value to be larger in a case where the detected lateral acceleration is substantially large, and to be smaller in a case where the detected lateral acceleration is substantially small.

9. The suspension apparatus according to claim 8, further comprising:

means for calculating a second target value of pressure difference based on a pressure difference between hydraulic cylinders of a right wheel and a left wheel; and means for determining a final target value of pressure difference for the cylinders of the right wheel and left wheel by subtracting the first target value of pressure difference from the second target value of pressure difference.

10. The suspension apparatus according to claim 8, wherein said setting means further comprises input means for inputting a vehicle speed, and calculates the first target value of pressure difference using the vehicle speed as another parameter.

11. The suspension apparatus according to claim 8, wherein said setting means further comprises means for setting a predetermined gain with respect to the first target value of pressure difference, and the characteristic of the predetermined gain is a high value at high speed range, and a low value at low speed range.

12. The suspension apparatus according to claim 8, wherein said control means sets a front target value of pressure difference for cylinders of the front-right and front-left wheels, and a rear target value of pressure difference for cylinders of the rear-right and rear-left wheels, and further comprises:

means for applying a front control gain to the front target value and a rear control gain to the rear target value, the front control gain being smaller than the rear control gain.

13. The suspension apparatus according to claim 8, wherein the vehicle includes four wheels, and said setting means sets said first target value for pressure differences between front right and left wheels, and rear right and left wheels, respectively and independently.

14. A suspension apparatus for vehicles capable of suppressing rolling movement by controlling resistance forces generated in at least two hydraulic cylinders which are respectively provided between a vehicle body and each of right and left wheels of the vehicle, comprising:

sensor means for detecting vehicle heights at said at least two wheel positions;

pressure detection means for detecting pressures in objective hydraulic cylinders of objective wheels which are provided on the front right and front left wheels, or rear right and rear left wheels, and are involved in a rolling movement of the vehicle body;

acceleration detection means for detecting a lateral acceleration of the vehicle body;

first calculating means for detecting a rolling component signal indicative of rolling movement of the vehicle based on detected vehicle-height signals for the object wheels and calculating a first control signal to control resistance forces generated in the objective hydraulic cylinders;

setting means for setting a first target pressure difference of the objective hydraulic cylinders of the object wheels, the first target pressure difference being determined based on the pressure difference detected on the objective hydraulic cylinders;

second calculating means for correcting said first target pressure difference based on the detected lateral acceleration, and calculating a second control signal to control resistance forces generated in the objective hydraulic cylinders;

means for summing said first and second control signals, and outputting the summed signal to an actuator which alters resistance forces of the objective hydraulic cylinders; and roll control means for controlling a rolling movement of the vehicle body by altering resistance forces in said objective hydraulic cylinders, wherein the setting means sets the first target difference pressure to a first value in a case where the detected lateral acceleration signal is substantially large and to a second value which is smaller than the first value in a case where the detected lateral acceleration signal is substantially small.

15. The suspension apparatus according to claim 14, further comprising:
   means for calculating a second target pressure difference based on a pressure difference between hydraulic cylinders of a right wheel and a left wheel; and
   means for determining a final target value of pressure difference for the cylinders of the right wheel and left wheel by subtracting the first target difference from the second target pressure difference.

16. The suspension apparatus according to claim 14, wherein said setting means further comprises input means for inputting a vehicle speed, and calculates the first target pressure difference using the vehicle speed as another parameter.

17. The suspension apparatus according to claim 14, wherein said setting means further comprises means for setting a predetermined gain with respect to the first target value of pressure difference, and the characteristic of the predetermined gain is a high value at high speed range, and a low value at low speed range.

18. The suspension apparatus according to claim 14, wherein said control means sets a front target value of pressure difference for cylinders of the front-right and front-left wheels, and a rear target value of pressure difference for cylinders of the rear-right and rear-left wheels, and further comprises:
   means for applying a front control gain to the front target value and a rear control gain to the rear target value, the front control gain being smaller than the rear control gain.

19. The suspension apparatus according to claim 14, wherein the vehicle includes four wheels, and said setting means sets said first target value for pressure differences between front right and left wheels, and rear right and left wheels, respectively and independently.

20. A suspension apparatus for a vehicle capable of suppressing rolling movement by controlling resistance forces generated by hydraulic cylinders which are respectively provided between a vehicle body and right and left wheels of the vehicle comprising:
   pressure detection means for detecting a pressure in the hydraulic cylinders;
   acceleration detection means for detecting a lateral acceleration of the vehicle body, and calculating a change of the lateral acceleration with respect to time;
   control means for setting a first target value of pressure difference between objective hydraulic cylinders which are involved in a rolling movement of the vehicle body based on the pressures detected by the pressure detection means and the change of lateral acceleration with respect to time, and controlling a resistance force generated by each of said objective hydraulic cylinders so that a pressure difference between the objective hydraulic cylinders becomes the set first target value,
   wherein the control means sets the first target value to a first value in a case where a lateral acceleration detected by the acceleration detection means is substantially large and to a second value in a case where a lateral acceleration detected by the acceleration detection means is substantially small, said first value being larger than the second value.

* * * * *

UNITED STATES PATENT AND TRADEMARK OFFICE
CERTIFICATE OF CORRECTION

PATENT NO.: 5,893,041
DATED : April 6, 1999
INVENTOR(S): Mincharu SHIBATA, et al.

It is certified that error appears in the above-identified patent and that said Letters Patent is hereby corrected as shown below:

Title Page, [57] ABSTRACT, line 5, delete "-";

Column 6, line 65, change "calculator" to --calculators--;

Column 8, line 23, change "$K_{FR1}$" to --$K_{RF1}$--;

Column 9, line 28, change "$K_{FR2}$" to --$K_{RF2}$--.

Signed and Sealed this

Eighteenth Day of January, 2000

Attest:

Q. TODD DICKINSON

*Attesting Officer*  *Commissioner of Patents and Trademarks*